Sept. 15, 1953          R. M. SMITH          2,652,555
              WHEEL SLIP PROTECTIVE SYSTEM
                  Filed Nov. 28, 1952

Inventor:
Russell M. Smith,
by Claude A. Mott
His Attorney.

Patented Sept. 15, 1953

2,652,555

UNITED STATES PATENT OFFICE 2,652,555

WHEEL SLIP PROTECTIVE SYSTEM

Russell M. Smith, Ripley, N. Y., assignor to General Electric Company, a corporation of New York Application November 28, 1952, Serial No. 323,020

11 Claims. (Cl. 340—268)

This invention relates to systems for detecting the wheel slip of rail vehicles, such as that disclosed and claimed in Patent 2,595,342 to William D. Ryckman, issued April 8, 1952.

In the operation of self-propelled rail vehicles, such as diesel-electric locomotives, for example, having a plurality of electric traction motors separately connected to the driving axles, one pair of wheels connected to an axle sometimes slips on the track. This wheel slippage may occur when rapid acceleration is attempted under heavy load conditions, and may also occur when the locomotive is running at high speed due to track condition, track irregularities, vibration, etc. When such slippage occurs, the motor driving the slipping axle accelerates to a higher speed than the other motors and may be damaged due to the resultant high mechanical stresses. Furthermore, when the traction motors are connected for energization in either series or parallel circuit relation, the slipping axle relieves its connected motor of a substantial portion of the load so that the remaining motors connected to the non-slipping axles are subjected to higher currents and are in turn liable to cause additional wheels to slip. In addition, wheel slip may occur during braking as a result of locked brakes, causing substantial damage to the locked wheels.

It is therefore desirable in the design of such vehicles to provide for the detection of wheel slippage, the detecting device being connected either to reduce the energization of the motor connected to the slipping axle or merely to give an indication to the engineman of the wheel slippage so he can manually reduce the excitation to the traction motors.

Numerous arrangements for wheel slip detection have been used in the past including the field drop comparison system, as shown in Patent 2,328,994 to Harold S. Ogden, issued September 7, 1943, and assigned to the assignee of the present application. Other systems have utilized centrifugal switches on the axles, pneumatic devices using a friction drive inertia flywheel, and commutator and brush arrangements which compare the speed of the two axles on the same truck. The system disclosed in the above-mentioned Ryckman patent in which the current from a tachometer unit responsive to the speed of each axle is balanced against the total of the tachometer currents from all axles in order to compare the speed of one axle with the average speed of all the axles has proved very satisfactory. Ryckman's arrangement, however, requires one relay for each axle, with each relay involving at least one set of switch contacts, and it is desirable that the number of relays and contacts be reduced if possible in order to simplify the operation and maintenance of the wheel slip detection system.

Accordingly, it is an object of this invention to provide a wheel slip detection system in which the speed of each axle is compared with the average speed of all the axles in the manner of the Ryckman system, but which employs a minimum of relays and contacts.

More specifically, it is an object of the present invention to provide a wheel slip detection system in which only a single relay is required on a rail vehicle for comparing the speed of any axle with the average of the speeds of all the axles.

A feature of my invention is that it provides a system which makes it possible to interconnect two or more separate locomotive units, and thereby detects simultaneous wheel slip of all of the axles on one locomotive unit.

Further objects, features and advantages of this invention will be apparent from the following detailed description of a preferred embodiment thereof, while the scope of the invention is set forth in the appended claims.

In carrying out my invention in one form, I provide a protective system which includes a tachometer unit for each motored axle of a locomotive unit. A pair of rectifiers is provided for each tachometer, and the various tachometers and their rectifiers are connected to a single electroresponsive device in a manner such that the voltage of each tachometer is compared with the voltages of the remaining tachometers. If the voltage of any tachometer differs from the others, either above or below, by a predetermined amount, the electroresponsive device operates and provides a visible signal.

For a clearer and more complete understanding of my invention, reference should be had to the accompanying drawing, the single figure of which is a schematic circuit diagram of the wheel slip protection system of my invention for use on a two-unit locomotive.

Referring to the drawing, there is shown a wheel slip protection system in accordance with this invention for a two-unit locomotive, each of which has four motored axles, the two-unit locomotive being labeled 150 and 250, respectively, on the drawing. The portion of the system for a single locomotive unit is described first, and the immediately succeeding portion of the description of a preferred embodiment of the invention refers only to unit 150.

Locomotive unit 150 is illustrated diagrammatically as having two axle-trucks with tachometer generators 101, 102, 103 and 104 being driven respectively by axles 105, 106, 107 and 108. All four generators preferably are substantially identical so that all produce approximately the same voltage for a selected speed. It will be understood that the voltage of these generators is approximately proportional to the speed over the operating range of the generators. These tachometer generators preferably are mounted directly on their respective axles, but may be driven by the axles in any suitable manner. As indicated schematically on the drawing, each of the tachometers is a conventional small direct current generator; however, other tachometer generators may be used. For example, machines 101, 102, 103 and 104 could be alternating current generators with a suitable rectifier associated with each, if desired. The important consideration is that a unidirectional potential signal responsive to the speed of each axle be provided.

As shown, generators 101 to 104, inclusive, are connected to provide potential drops proportional to axle speeds across a plurality of substantally identical resistors 109, 110, 111 and 112, respectively, during such times as the generators are being operated by their respective axles. Each of the negative terminals of the tachometer generators is connected to a common bus designated on the drawing by the numeral 122.

Resistors 109–112, inclusive, may have capacitors 113, 114, 115 and 116 connected respectively thereacross, if desired, in order to filter out any alternating components which may be present in the voltages generated by the tachometer generators. If conventional direct current generators are used, as illustrated in the drawing, these capacitors ordinarily are not required, but they may be necessary if alternating current tachometer generators are used and their outputs rectified. If alternating current generators were employed and no capacitors were used, and if there should be phase differences between the various generators, the accumulative effects of the alternating components might combine to cause a false operation of the wheel slip protective system.

In accordance with this invention, a single electroresponsive device may be used to indicate when any axle on locomotive unit 150 differs in speed by a predetermined amount from the average speed of the other axles or from the speed of any one of the other axles on the locomotive unit. In the drawing such an electroresponsive device is shown as a relay comprising a solenoid 120 having an operating coil 120a and switch 121 which is closed by the solenoid when a predetermined voltage is applied to the solenoid coil. As shown in the drawing, the contacts of switch 121 are connected in circuit with an indicating light 123 across a source of electrical potential indicated by the conductors 124 and 125, so that when the switch 121 is closed, light 123 is illuminated to indicate to the engineman that a locked wheel or wheel slipping is occurring. It will be readily understood that relay 120, 121 can be arranged to perform a control operation such as reducing excitation on the main traction generator if desired instead of, or in addition to, giving a visible alarm.

The coil 120a of solenoid 120 may be provided with a pair of terminals 120b and 120c. Between these two terminals are connected a plurality of pairs 117 and 118 of half-wave rectifiers, all of which are poled to carry current from terminal 120c toward terminal 120b. The system includes the same number of pairs of rectifiers as there are tachometer generators and axles, and the positive terminal of each of the tachometer generators is connected to a midpoint 119 of a pair of rectifiers 117 and 118.

With this arrangement, as long as all of the valves are turning at the same speed so that each of the tachometer generators is generating approximately the same voltage, there is no voltage impressed across coil 120a of the solenoid and the switch 121 remains open. If, however, the speed of one axle should exceed that of the others due to slipping, the voltage generated by its tachometer generator will exceed that of the other generators. Assuming for a moment that axle 105 is slipping so that generator 101 is producing an abnormally high voltage, current will then flow from the positive terminal of generator 101, through mid-point 119 connected thereto, through the corresponding rectifier 118, through operating coil 120a of solenoid 120 from terminal 120b to terminal 120c, and thence through the rectifiers 117 for the other three generators and through resistances 110, 111 and 112 to the common bus 122, from which it returns to the negative terminal of generator 101. When the current flowing through the circuit exceeds a predetermined amount corresponding to a preselected voltage difference between generator 101 and the other generators, solenoid 120 operates to close switch 121 and illuminate light 123.

With conditions otherwise the same as in the preceding paragraph, it will be understood that if one of the three generators 102, 103 and 104 should be running slower than the other two due to its axle operating at a lower speed, that the current from generator 101, which is generating an excessive voltage, after flowing through solenoid 120 will then flow through rectifier 117 of the slower than normal generator only. Assuming, for example, that generator No. 104 is operating at a lower speed than generators 102 and 103, then the return circuit for generator 101 will be through resistor 112 only back to common bus 122 and thence to the negative terminal of generator 101. Thus, this system detects the highest and the lowest voltages being generated by any two of the tachometer generators and when the difference between these voltages reaches a predetermined amount, it operates the electroresponhive device to indicate such condition.

If one of the generators, such as No. 101, should operate at a lower speed than the others, due to a locked brake, for example, the other three generators would then supply current through their respective rectifiers 118 and through the solenoid coil 120a and thence through rectifier 117 of generator 101, to operate the electroresponsive device 120, 121, in the same manner as described previously to indicate that the wheels associated with axle 101 were locked.

An important feature of this system is that it is readily adaptable for use with multi-unit locomotives, and when it is so used it provides for the detection of simultaneous wheel slipping of all the motored axles on one locomotive unit. The speeds of the axles on one locomotive unit are compared to the axle speeds on the other unit or units, and if all the axles on one unit are slipping, or are locked, an indication is given.

Referring to the second locomotive unit 250 on the drawing, it will be seen that this unit is provided with exactly the same protective arrangement as unit 150. On unit 250 each of the items has been given a reference numeral the same as the corresponding item on the unit 150 except that on unit 250 each of the items is in the 200 series whereas the items on unit 150 are labeled in the 100 series. If the locomotive unit 250 should be operating separately, the protective equipment operates exactly the same as described hereinbefore for unit 150. And even when unit 250 is operating as one unit of a complete locomotive, the slip of any one or more axles on unit 250 with respect to another axle or axles on this unit will be detected and indicated in the manner previously described.

In order to operate locomotive units 150 and 250 in multiple, it is necessary only to connect the common terminals of rectifiers 117 on unit 150 with the common terminal of rectifiers 217 on the other unit, as by a conductor 26. A return circuit must be provided, of course, and this is indicated on the drawing by conductor 27 which interconnects the negative terminals of batteries 130 and 230 on the two locomotive units. Ordinarily, when two or more locomotive units are coupled to make a complete locomotive, the negative terminals of the main batteries are automatically coupled in this manner so that connection 27 is ordinarily provided already on most multiple unit locomotives. In practice, there is in most cases several volts drop in the negative battery connection between cabs of the same locomotive and this may cause difficulty in some instances with the operation of this protective system. Such difficulties can be readily eliminated, however, by connecting the common bus 122 of the first unit to the corresponding common bus 222 of the second unit and to similar common buses on each of the other locomotive units by means of a connection 28 so that conductor 28 provides the return path, and at the same time inserting resistors 129, 229 and the like between the respective common buses and the negative terminals of the respective main batteries.

With this arrangement, if all of the driven axles on locomotive unit 150, for example, should slip simultaneously, current will flow, due to the increased voltage of generators 101–104, inclusive, through their respective rectifiers 118, through coil 120a of relay 120, 121, thence through conductor 26 and through rectifiers 217 and resistors 209–212, inclusive, in parallel, to bus 222, from which the current returns through conductor 28 to bus 122 and the negative terminals of the generators on locomotive unit 150. When this current flow reaches a predetermined value, the voltage drop across coil 120a causes electroresponsive device 120, 121 to operate and give an indication that simultaneous slipping of the wheels on locomotive unit 150 is occurring.

If all the wheels on locomotive unit 250 should slip simultaneously, the action would be the same as above except that the generators on the latter locomotive unit would cause electroresponsive device 220, 221 to provide an indication. It will be understood, of course, that indicating light 223 on the second locomotive unit may be located in the same cab with indicating light 123 on the leading locomotive unit if desired when the two units are being operated in multiple. Or, electroresponsive device 220, 221, as indicated previously in connection with electroresponsive device 120, 121, can be arranged to perform a control operation in connection with unit 250, such as reducing the excitation on the traction generator which supplies the motors on this unit, in order to stop the wheels slipping.

It will be apparent from the foregoing that my wheel slip protection system provides accurate detection for wheel slip or wheel locking for any one or more axles on an individual locomotive or locomotive unit, while simultaneously providing for the detection of the simultaneous slipping or sliding of all axles on one unit of a multiple unit locomotive, all of this being accomplished with a single electroresponsive device for each individual locomotive or separate locomotive unit. In this connection, it should be understood that other electroresponsive devices may be substituted in this system without departing from my invention if desired. Also, it should be pointed out that the system is not limited to the use of particular rectifiers, and while I prefer to use dry type rectifiers of the copper oxide, selenium, or germanium type, other rectifiers, or other unidirectional conducting devices, regardless of which they may be called, may be substituted in this system without departing from my invention.

Therefore, while I have illustrated and described a particular embodiment of this invention, further modifications and improvements will occur to those skilled in the art. Accordingly, it should be understood that this invention is not limited to the form shown and that I intend to cover in the appended claims all modifications which fall within the true spirit and scope of my invention.

What I claim as new and desire to secure by Letters Patent of the United States is:

1. A system responsive to the occurrence of a predetermined voltage difference between two of a plurality of sources of unidirectional potential, comprising an electroresponsive device having two terminals, a plurality of pairs of rectifier devices connected in parallel between the said two terminals, each pair comprising two rectifiers in series with both rectifiers poled to carry current from one of the said terminals toward the other said terminal, means for connecting the plurality of sources of unidirectional potential respectively to the mid-points of said pairs of rectifiers, and means providing for a common current return connection for the sources of potential.

2. A system responsive to the occurrence of a predetermined voltage difference between two of a plurality of sources of unidirectional potential, comprising an electroresponsive device having two terminals, a plurality of pairs of rectifier devices connected in parallel between the said two terminals, each pair comprising two rectifiers in series with both rectifiers arranged to carry current from one of the said terminals toward the other said terminal, a common return bus, a plurality of resistors connected respectively between the mid-points of said pairs of rectifiers and said common bus, and means for connecting a plurality of sources of unidirectional potential respectively across said plurality of resistors to provide voltage drops across the resistors corresponding respectively to the voltages of the said sources.

3. In combination, a plurality of substantially identical generators, an equal number of substantially identical resistors connected to be energized respectively by the said generators, means providing a common connection for one terminal of each of the said generators, an electroresponsive device having two terminals, a plurality of pairs of half-wave rectifiers connected in parallel between the said two terminals, each pair comprising two rectifiers in series with both rectifiers poled to carry current from one of the said terminals toward the other said terminal, and means connecting the other terminals of the plurality of generators respectively to the mid-points of the said pairs of rectifiers, whereby when the difference in the voltages generated by any two of the generators reaches a predetermined value the said electroresponsive device operates to give an indication of such occurrence.

4. A system responsive to the occurrence of a predetermined difference in voltage between two of a plurality of unidirectional voltages, comprising positive and negative terminal connections to a plurality of sources of unidirectional potential, means connecting one of the polarities of the unidirectional potential sources to a common bus, an electroresponsive device responsive to a predetermined voltage and having two terminals, means connecting the other of the polarities of the unidirectional potential sources respectively through a plurality of unidirectional conducting devices to one terminal of the said electroresponsive device, said unidirectional conducting devices being arranged to carry current toward said electroresponsive device, and means connecting the other terminal of the said electroresponsive device to the said other polarities of the unidirectional potential sources respectively through a plurality of unidirectional conducting devices arranged to carry current away from the said electroresponsive device.

5. A system responsive to the occurrence of a predetermined difference in voltage between any one of a plurality of direct current generators and the voltage of the other generators, comprising means connecting the generator terminals of one polarity to a common bus, an electroresponsive device responsive to a predetermined voltage and having two terminals, means connecting the generator terminals of the other polarity respectively through a plurality of rectifiers to one terminal of said electroresponsive device, said rectifiers being arranged to carry current toward the said electroresponsive device, means connecting the other terminal of the said electroresponsive device to the said generator terminals of the other polarity respectively through a plurality of rectifiers arranged to carry current away from said electroresponsive device, and current return means connected respectively between the said other polarity terminals of the generators and the said common bus.

6. A wheel slip detection system for a rail vehicle having a plurality of axles, comprising a plurality of means respectively operatively connected to said axles for producing unidirectional voltage signals responsive respectively to the speeds thereof, an electroresponsive device having two terminals, means for connecting said plurality of signal producing means in parallel to one of the said two terminals respectively through a plurality of rectifiers arranged to carry current toward the said terminal, means for connecting the other terminal of the electroresponsive device to the said signal producing means in parallel through a second plurality of rectifiers arranged to carry current away from said electroresponsive device, and means providing a common current return connection for said plurality of signal producing means.

7. A wheel slip detection circuit for a rail vehicle having a plurality of axles, comprising a plurality of direct current generators driven respectively by the axles, each generator having a resistor connected between the positive and negative output terminals thereof, means connecting one terminal of each generator of a common polarity to a common bus, an electroresponsive device responsive to a predetermined voltage and having two terminals, a plurality of rectifier devices, circuit means connecting the other terminals of the said generators to a first one of the said two electroresponsive device terminals respectively through said rectifier devices, said rectifier devices being arranged to conduct current from the said other generator terminals toward the said first electroresponsive device terminal, an additional plurality of rectifier devices, and additional circuit means connecting said additional rectifier devices respectively between the second terminal of the said electroresponsive device and the said other terminals of the generators, the additional plurality of rectifier devices being arranged to conduct current away from the electroresponsive device toward the said other generator terminals.

8. A wheel slip detection system for a locomotive having a plurality of motored axles, comprising a plurality of substantially identical direct current generators driven respectively by the motored axles, a plurality of substantially identically resistors connected respectively between the positive and negative output terminals of the said generators, means connecting the negative terminal of each of the generators to a common bus, a solenoid device including an operating coil having a pair of terminals, a switch arranged to be operated by the said solenoid device upon the occurrence of a predetermined voltage drop across the said coil, a plurality of half-wave rectifiers equal to the number of generators, circuit means connecting the positive terminals of the said generators to a first one of the terminals of the said coil respectively through said rectifiers, said rectifiers being arranged to conduct current from the said generator positive terminals toward said first coil terminal, an additional plurality of half-wave rectifiers equal to the number of generators, additional circuit means connecting said additional rectifiers respectively between the second terminal of the said coil and the said positive terminals of the generators, the additional plurality of rectifiers being arranged to conduct current away from the said coil toward the said generator positive terminals, whereby a difference in the voltage produced by one or more of the said generators with respect to the voltages of one or more of the other generators causes a current to flow through the said coil, a predetermined current through the said coil resulting in the said predetermined voltage drop across the coil whereupon the said solenoid device operates the said switch, and means responsive to the operation of said switch for providing a visual indication to show that the said one or more of the generators is operating at a speed different by a predetermined amount than the speed of the said one or more of the other generators.

9. A wheel slip detection system for a rail vehicle having at least two units, each unit having a plurality of axles, the system comprising for each unit a plurality of means respectively operatively connected to the axles for producing unidirectional voltage signals responsive respectively to the speeds of the axles, an electroresponsive device having two terminals, means for connecting said plurality of signal producing means in parallel to one of the said two terminals respectively through a plurality of rectifiers arranged to carry current toward the said terminal, means for connecting the other terminal of the electroresponsive device to the said signal producing means in parallel through a second plurality of rectifiers arranged to carry current away from said electroresponsive device, and means providing a common current return connection for the said plurality of signal producing means for one unit, and in addition to the foregoing, means for interconnecting the portions of the system located on the respective units.

10. A wheel slip detection system for a multi-unit rail vehicle having a plurality of axles on each unit, comprising a plurality of means respectively operatively connected to the axles of a first unit of the vehicle for producing unidirectional voltage signals proportional respectively to the speeds of the axles of the first unit, a first electroresponsive device having two terminals, means for connecting said plurality of signal producing means in parallel to one of the said two terminals of the first electroresponsive device respectively through a plurality of rectifiers arranged to carry current toward this terminal, means for connecting the other terminal of the said first electroresponsive device to the said voltage signal producing means in parallel through a second plurality of rectifiers arranged to carry current away from said first electroresponsive device, means providing a common current return connection for said plurality of said signal producing means for the first unit, a second plurality of signal producing means respectively operatively connected to the axles of a second vehicle unit for producing unidirectional voltage signals proportional respectively to the speeds of the axles of the second unit, a second electroresponsive device having two terminals, means for connecting the said second plurality of signal producing means in parallel to one of the said two terminals of the second electroresponsive device respectively through a third plurality of rectifiers arranged to carry current toward this terminal, means for connecting the other terminal of the second electroresponsive device to the said second signal producing means in parallel through a fourth plurality of rectifiers arranged to carry current away from the said second electroresponsive device, means providing a common current return connection for the said second plurality of signal producing means, means interconnecting the said first and second common return connections, and means connecting one terminal of the first electroresponsive device with the corresponding terminal of the second electroresponsive device.

11. A wheel slip detection system for a multi-unit locomotive having a plurality of motored axles on each of at least two of the units thereof, the system comprising a plurality of substantially identical direct current tachometer generators driven respectively by the motored axles of a first unit of the locomotive for producing voltage signals proportional respectively to the speeds of the axles of the first unit, a first plurality of substantially identical resistors connected respectively between the positive and negative output terminals of the said first plurality of generators, a first common bus and means connecting the said negative terminals of each of the first plurality of generators to the said first common bus, a first electroresponsive device having two terminals and operative upon the occurrence of a predetermined voltage drop thereacross, a first plurality of half-wave rectifiers equal to the number of said first plurality of generators, circuit means connecting the said positive terminals of the first plurality of generators to a first one of the terminals of the said first electroresponsive device respectively through the said first plurality of rectifiers, said rectifiers being arranged to conduct current from the said generator positive terminals toward said first electroresponsive device terminal, a second plurality of half-wave rectifiers equal in number to the said first plurality of generators, additional circuit means connecting the said second plurality of rectifiers respectively between the second said terminal of the first electroresponsive device and the said positive terminals of the first plurality of generators, the second plurality of rectifiers being arranged to conduct current away from the said first electroresponsive device and toward the said generator positive terminals, said first electroresponsive device operating upon the occurrence of a predetermined voltage difference between any two of the said first plurality of generators thereby indicating a predetermined difference in speed between the corresponding axles, a second plurality of substantially identical direct current tachometer generators driven respectively by the motored axles of a second locomotive unit, a second plurality of substantially identical resistors connected respectively between the positive and negative output terminals of said second plurality of generators, a second common bus and means connecting the negative terminals of each of the said second plurality of generators to the said second common bus, a second electroresponsive device having two terminals and operative upon the occurrence of a predetermined voltage drop thereacross, a third plurality of half-wave rectifiers equal to the number of the said second plurality of generators, circuit means connecting the positive terminals of the second plurality of generators to a first one of the terminals of the said second electroresponsive device respectively through said third plurality of rectifiers, said third plurality of rectifiers being arranged to conduct current from the positive terminals of the said second plurality of generators toward the said first terminal of the said second electroresponsive device, a fourth plurality of half-wave rectifiers equal in number to the said second plurality of generators, additional circuit means connecting said fourth plurality of rectifiers respectively between the second said terminal of the said second electroresponsive device and the said positive terminals of the second plurality of generators, the said fourth plurality of rectifiers being arranged to conduct current away from the said second electroresponsive device and toward the positive terminals of the said second plurality of generators, said second electroresponsive device operating upon the occurrence of a predetermined voltage difference between any two of the said second plurality of generators thereby indicating a predetermined difference in speed between the corresponding axles, circuit means interconnecting the said first and second common buses, and additional circuit means connecting the said second terminal of the first electroresponsive device with the said second terminal of the second electroresponsive device whereby a difference in the speed of all the motored axles on the first said locomotive unit from the speed of the motored axles on the said second locomotive unit causes said first electroresponsive device to operate and a predetermined difference in speed of all the motored axles on the second locomotive unit from the speed of all the axles on the first locomotive causes the said second electroresponsive device to operate.

RUSSELL M. SMITH.

References Cited in the file of this patent

UNITED STATES PATENTS

| Number | Name | Date |
|---|---|---|
| 2,504,965 | Davis | Apr. 25, 1950 |
| 2,592,342 | Ryckman, Jr. | Apr. 8, 1952 |
| 2,601,140 | Hines | June 17, 1952 |